June 30, 1936. O. H. DICKE 2,045,900
INTERLOCKING SYSTEM FOR RAILROADS
Filed Aug. 18, 1931 3 Sheets-Sheet 3
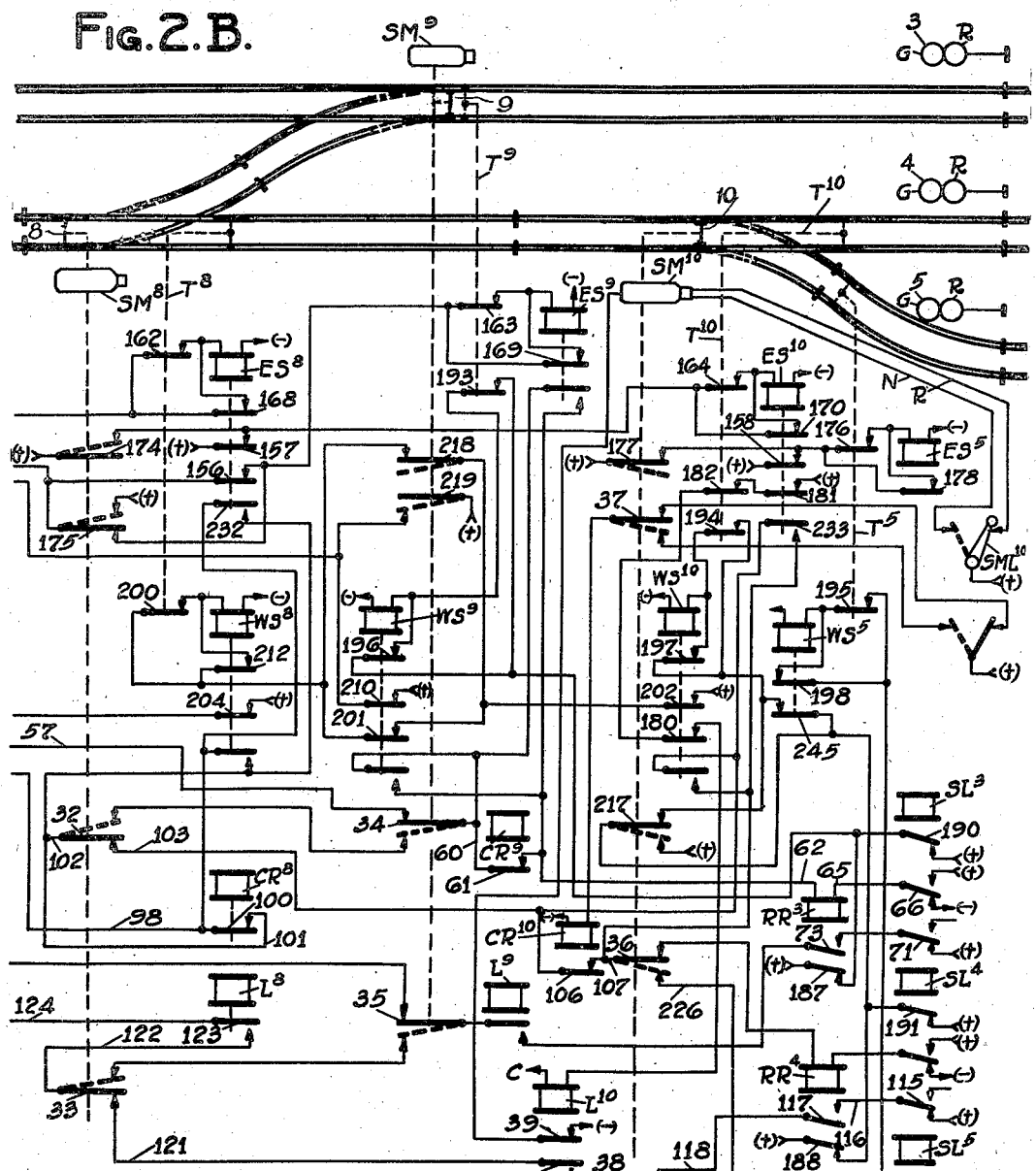
FIG. 2.B.
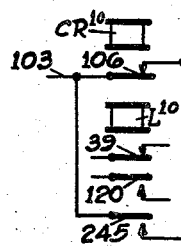
FIG. 3.
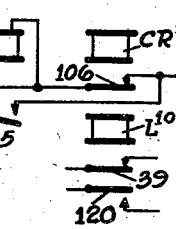
FIG. 4.
INVENTOR
O. H. Dicke
BY Neil H. Ralston
his ATTORNEY Patented June 30, 1936

2,045,900

UNITED STATES PATENT OFFICE 2,045,900

INTERLOCKING SYSTEM FOR RAILROADS

Oscar H. Dicke, Rochester, N. Y., assignor to General Railway Signal Company, Rochester, N. Y.

Application August 18, 1931, Serial No. 557,809

44 Claims. (Cl. 246—134)

This invention relates to interlocking systems, and more particularly to interlocking systems of the free-lever type.

A free-lever interlocking system is one in which the levers for the various switch machines and signals control the same electrically and cannot be locked either mechanically or electrically, the entire interlocking of the various traffic controlling devices being accomplished by electrical isolation of circuit portions. If it is desired to interlock traffic controlling devices of a railway interlocking plant by circuit isolation, it is economical and expedient to so organize the circuits that certain contacts, certain wires and certain relays may form parts in numerous routes which may be set up through the interlocking plant, which obviously is an economic expedient in that fewer relays, fewer wires and fewer contacts will be required, in the system. Also, if it is desired to pre-condition a route conflicting with a set-up route it is very important that the operation of levers for the proposed route which is being preconditioned (setting the levers to establish a new route in conflict with an existing route) will not in any way effect a clear signal governing traffic over the set-up route.

In this connection, it should be borne in mind that if a switch lever is operated to set up a new route (it being presumed that the switch is locked against movement by reason of an existing route) and a signal lever governing over said switch is operated, it is possible in accordance with ordinary signal practice to have a signal clear governing over a wrong route, namely the route corresponding to the then existing position of such switch. This would of course be undesirable in that a train might act on such signal and move over a route not contemplated by the operator. For this reason, a signal should not be able to be cleared unless the switch machine lever assumes a position corresponding to that of the switch it controls. This latter function may be accomplished by a "correspondence relay" which is energized only if the track switch is in correspondence with the lever controlling the same. If a contact of such a correspondence relay were included in the signal circuit it would be possible to put such signal to stop by moving the switch lever, which of course is undesirable and detrimental to the proper control of trains through an interlocking plant.

In view of the foregoing and other important considerations, it is proposed in accordance with the present invention to so organize the system that many contacts, wires and relays may be used in a large number of routes, and so that all of the switch levers as well as the signal lever of a proposed route may be pre-conditioned (operated to their new position) without in any way effecting a clear signal in the interlocking plant or in any way effecting operation of a switch machine until the train on the conflicting route has passed beyond the switch associated with said switch machine, and in which a signal cannot be cleared unless all of the levers for controlling the track switches of the route over which such signal governs are in correspondence with their switches, this being accomplished by including correspondence relay contacts in the route signal circuit, and in shunting out these correspondence contacts after the signal governing over such route has been cleared. In one form of the invention these shunting contacts comprise contacts of series relays included in the route signal circuit, and in another form of the invention these correspondence contacts are shunted out by back contacts of directional track repeater stick relays, which repeater relays assume their deenergized position as soon as the route circuit is energized to clear a route over the various switches having correspondence contacts in this route circuit.

Another feature of the present invention resides in the provision of signal circuits which include back contacts of lock relays of all of the track switches contained in the route over which such signal governs, and in providing suitable means for deenergizing such lock relays as soon as an attempt is made to clear a signal over such route. In one form of the invention this is accomplished by series of relays one included in each element of the route circuit, which series of relays upon being energized effect deenergization of the lock relay, and in another form of the invention these various lock relays are deenergized through the medium of track repeater stick relays of the usual directional type.

Other objects, purposes and characteristic features of the invention will in part be obvious from the accompanying drawings and will in part be more specifically pointed out hereinafter.

In describing the invention in detail reference will be made to the accompanying drawings, in which:—

Figs. 3 and 4 show modified arrangements for shunting a correspondence contact.

Figure 1:
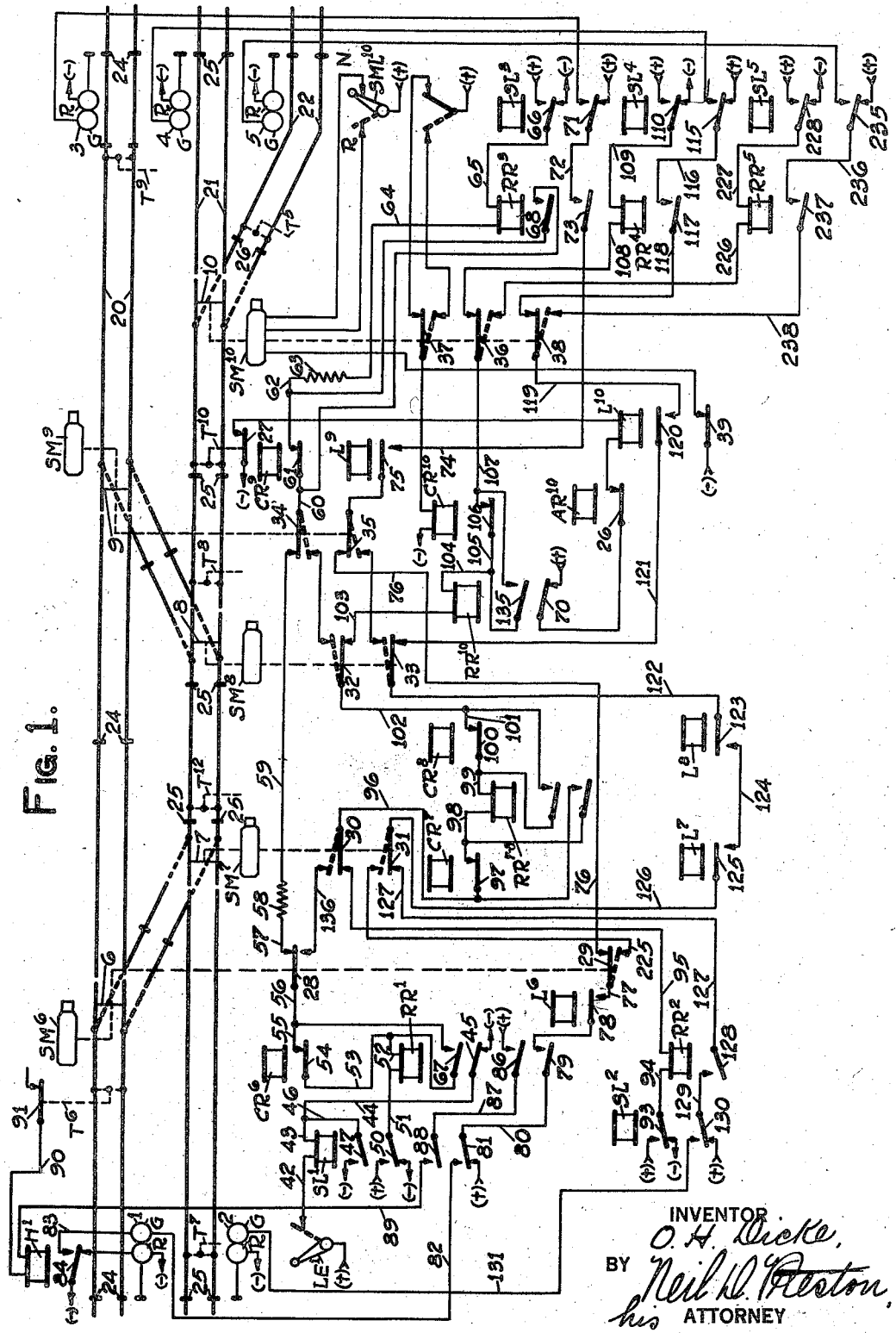
Fig. 1 shows conventionally an interlocking system embodying one form of the invention.

Referring to Fig. 1 of the drawings the track rails of two main tracks and a diverging track have been designated 20, 21 and 22, respectively, of which the rails 20 are divided into track sections by insulating joints 24, rails 21 are divided into isolated track sections by insulating joints 25, and the diverging track rails 22 are insulated from the track rails 21 by insulating joints 26. These track rails are interconnected through the medium of track switches 6, 7, 8, 9 and 10, of which the track switches 6 and 7 and also 8 and 9 constitute cross-covers. Each of these track switches has associated therewith a detector track circuit containing a track relay T having an exponent corresponding to the switch. Each of these track switches is preferably operated by a switch machine SM containing an exponent corresponding to the number of the track switch.

As illustrated, the entrance of traffic into each of these tracks is governed by a signal, these signals having been designated 1, 2, 3, 4 and 5, and although these signals may be three-position signals, they have for convenience been illustrated as two position signals each including a stop lamp R and a proceed lamp G.

By looking at this track layout it is readily apparent that six different routes may be set up over these tracks for each direction of train movement, and in addition to these six routes a run-around route may be set up over the cross-over 6—7 and 8—9. In other words, although only five signals have been illustrated these five signals actually control the movement of traffic over fourteen different routes.

The track switch 6 has associated therewith switch box contacts 28 and 29, track switch 7 has associated therewith switch box contacts 30 and 31, track switch 8 has associated therewith switch box contacts 32 and 33, track switch 9 has associated therewith switch box contacts 34 and 35, and track switch 10 has associated therewith switch box contacts 36, 37 and 38. Although these various contacts have been illustrated as switch box contacts, these contacts in practice comprise in series a polar and a neutral contact of a switch repeater relay, this in order that these contacts may be located in the central tower a considerable distance away from the track switch itself in order to simplify the wiring layout.

Each of the various switch machines is protected against improper operation by a suitable lock relay, and these relays are all connected the same and have been designated L, with an exponent corresponding to the number of the track switch. Of these various lock relays the control circuit of the lock relay $L^{10}$ only has been illustrated.

Similarly, although each of the switch machines is controlled by a suitable switch machine lever, for convenience these levers has been omitted from the drawings, except that the switch machine $SM^{10}$ has been shown controlled by its control lever $SML^{10}$. It will be noted that the lever $SML^{10}$ may energize either the normal circuit N or the reverse circuit R providing of course that the associated lock relay $L^{10}$ is energized, the contact 39 of the relay $L^{10}$ being included in the common return wire of the switch machine $SM^{10}$.

Each of the various signals 1, 2, 3, 4 and 5 has associated therewith a home relay, which home relay is governed in accordance with traffic conditions in advance of the signal, and of which the home relay $H^1$ for the signal 1 only has been illustrated. These various home relays are preferably controlled jointly in accordance with traffic conditions, the position of a signal lever as manifested by a signal relay SL (having an exponent corresponding to the signal) or route conditions as manifested by a route relay RR (having an exponent corresponding to the number of associated signal), and for convenience the control circuit for the signal 1 only has been illustrated in detail, which circuit will be more specifically described in connection with the operation of the system.

As heretofore pointed out each of the various track switches preferably has a correspondence relay associated therewith, which correspondence relay is only energized if the track switch and the lever for controlling the same assume corresponding positions. Such a correspondence relay CR (having an exponent corresponding to that of the associated track switch) is shown for each of the various track switches 6, 7, 8, 9 and 10, but the energizing circuit for the correspondence relay $CR^{10}$ only has been illustrated, for convenience.

It may be pointed out that the lock relay $L^{10}$, for instance, is controlled by front contacts 26 and 27 of relays $AR^{10}$ and $T^{10}$ respectively and back contact 70 of relay $RR^{10}$ in series, and that each of the other lock relays is similarly controlled.

*Operation.*—Since the various switches 6, 7, 8, 9 and 10 all assume the main track position, as shown, it is considered expedient to first point out how two routes may be set up simultaneously over the two main tracks.

Let us first assume that the operator desires to clear the signal 1 to set up east-bound traffic between the signals 1 and 3. Movement of the lever $LE^1$ to the clear position closes the following circuit for the signal relay $SL^1$:—beginning at the terminal (+) of a suitable source of current, contact of the lever $LE^1$, wire 42, winding of the relay $SL^1$, wires 43 and 44, back contact 45 of the relay $RR^1$, to the other terminal (—) of said source. The completion of this circuit effects energization of the relay $SL^1$, which relay $SL^1$ then sticks up through the following stick circuit:—(+), lever $LE^1$, wire 42, winding of relay $SL^1$, 43, 46, and stick contact 47 to the other terminal (—) of said source.

With the relay $SL^1$ now energized the following route circuit is closed:—beginning at the terminal (+) of a suitable source of current, front contact 50 of the relay $SL^1$, 51, winding of the relay $RR^1$, 52, 53, 54, 55, 56, 28, 57, resistance unit 58, 59, 34, 60, 61, 62, resistance unit 63, wire 64, winding of relay $RR^3$, 65, back contact 66 of relay $SL^3$ to the other terminal (—) of said source. The completion of this circuit effects energization of the relays $RR^1$ and $RR^3$, and as soon as these relays $RR^1$ and $RR^3$ are energized their respective contacts 67 and 68 shunt out the correspondence relay contacts 54 and 61, respectively. Also, picking up of the relays $RR^1$ and $RR^3$ effects deenergization of the lock relays $L^6$ and $L^9$ by contacts not illustrated, but illustrated for the lock relay $L^{10}$, namely, lifting of the back contact 70 of the relay $RR^{10}$ effects deenergization of the lock relay $L^{10}$, this same function being accomplished by the relays $RR^1$ and $RR^3$ for the lock relays $L^6$ and $L^9$, respectively. Attention is particularly directed to the fact that relay $RR^1$ has opened its back contact 45 included in the pick-up circuit for the lever relay SL$^1$, a similar contact (not shown) being provided for the relay SL$^2$, from which consideration it is apparent that the relay SL$^3$ cannot be energized after its associated relay RR$^3$ is energized, or in other words, the signal 3 cannot be cleared since an attempt has already been made to clear the signal 1, so that as a matter of fact the signals 1 and 3 are now interlocked through the route circuit containing relays RR$^1$ and RR$^3$, these relays now being associated with the same set-up route.

As soon as the various lock relays of the route from signal 1 to signal 3 have assumed their deenergized position the clear lamp G of the signal 1 is energized through the following circuit:—beginning at the terminal (+) of a suitable source of current, back contact 71 of the relay SL$^3$, 72, 73, 74, 75, 35, 76, 29, 77, 78, 79, 80, 81, 82, the clear lamp G of the signal 1, wire 83, front contact 84 of the home relay H$^1$, to the other terminal (—) of said source. It is, of course, understood that in the meantime the home relay H$^1$ was energized through the following circuit:—beginning at the terminal (+), front contact 86 of the relay RR$^1$, 87, 88, 89, winding of the relay H$^1$, wire 90, front contact 91 of the detector track relay T$^6$, and then through other contacts manifesting traffic conditions in advance, for convenience not shown in the drawings, to the other terminal (—) of said source. It is thus noted that the signal 1 cannot actually be cleared until the lock relays L$^6$ and L$^9$ have been deenergized, thus giving every precaution against the track switches 6 and 9 being operated with a signal governing thereover indicating proceed. Furthermore, as soon as a train has accepted the signal 1, these lock relays L$^6$ and L$^9$ will be held deenergized through a suitable approach relay illustrated only for the lock relay L$^{10}$, and designated AR$^{10}$, so that these track switches 6 and 9 are held locked until the rear end of the train has passed off of their associated detector track circuits, not specifically illustrated.

Let us now assume that the operator wishes to clear the signal 2; to do so he will operate the lever for the signal 2, thereby energizing the lever relay SL$^2$ (through the medium of a circuit not shown) and thereby effecting closure of the following route circuit:—beginning at the terminal (+) of a suitable source of current, front contact 93 of the relay SL$^2$, 94, winding of the relay RR$^2$, 95, 30, 96, 97, 98, winding of the relay RR$^{7-8}$, 99, 100, 101, 102, 32, 103, winding of the relay RR$^{10}$, 104, 105, 106, 107, 36, 108, winding of the relay RR$^4$, 109, back contact 110 of relay SL$^3$, to the other terminal (—).

Completion of this circuit will of course effect energization of relays RR$^2$, RR$^{7-8}$, RR$^{10}$ and RR$^4$. The relay RR$^{10}$ will pick up its back contact 70 and will effect deenergization of the lock relay L$^{10}$. Similarly, energization of the relay RR$^{7-8}$ will effect deenergization of the lock relays L$^7$ and L$^8$ through the medium of suitable contacts and circuits not specifically illustrated, but similar to the circuit effecting deenergization of the relay L$^{10}$. With these various lock relays L$^7$, L$^8$ and L$^{10}$ deenergized, the signal 2 may be cleared through the following circuit:—beginning at the terminal (+), back contact 115 of the relay SL$^3$, 116, 117, 118, 38, 119, 120, 121, 33, 122, 123, 124, 125, 126, 31, 127, 128, 129, front contact 130 of the relay SL$^2$, through a branch circuit including the wire 131 and clear lamp G of signal 2, and contacts of a suitable home relay (not specifically illustrated).

Let us now assume that the two routes extending from signal 1 to signal 3 and extending from signal 2 to signal 4, respectively, are still set up and are occupied by trains, and that the operator wishes to pre-condition a third route extending from signal 1 to signal 5, so that this third route may be established as quickly as possible after it is safe to do so. In order to accomplish this the operator will move the levers of the switch machines SM$^6$, SM$^7$ and SM$^{10}$ to their abnormal position. Operation of the lever SML$^{10}$, for instance, to its dotted position will effect deenergization of the correspondence relay CR$^{10}$, but such movement of the lever SML$^{10}$ will not effect operation of the switch machine SM$^{10}$, because the switch machine control circuits are open at the contact 39 of the lock relay L$^{10}$. Also, opening of the correspondence contact 106 of relay CR$^{10}$ will not effect deenergization of the route circuit in which it is included, because this contact 106 is shunted by contact 135 of relay RR$^{10}$. For similar reasons, the switch machines SM$^6$ and SM$^7$ cannot be operated even though their levers have already been moved to the cross-over position.

Obviously, movement of the signal lever for the signal 5 to its clear position will not result in clearing of the signal 5, because the route circuit for relay RR$^5$ is open at the switch box contact 36 of track switch 10, and similarly, the circuit for the signal 5 is open at the switch box contact 38.

Let us now assume that the two east-bound trains have advanced to a point to entirely clear the cross-over 6—7. Under this condition, the lock relays L$^6$ and L$^7$ will be reenergized, assuming of course that the levers for the signals 1 and 2 have in the meantime been returned to their stop position. However, the lock relay L$^{10}$ remains deenergized, because the approach relay AR$^{10}$ is still deenergized as the train on the route 2—4 is still on the approach section, which traffic condition is manifested by the approach relay AR$^{10}$. This approach relay AR$^{10}$ may be controlled, for instance, as indicated in the prior application of S. N. Wight, Ser. No. 120,423 filed July 3, 1926, may be controlled the same as the relay AR of the prior application of S. N. Wight, Ser. No. 48,553 filed August 6, 1925, or may be a relay controlled by the two front contacts in series of directional stick relays WS$^{10}$ and ES$^{10}$ shown in Fig. 2 of the drawings. It may be pointed out here that the relays ES$^{10}$ and WS$^{10}$ are so controlled that they are both up when a departing train has passed beyond the point at which they are located. From this consideration it is also apparent that, when the two east-bound trains have advanced to a point beyond the cross-over 8—9, the switch machines SM$^8$ and SM$^9$ are free to operate, but since the levers for these switch machines SM$^8$ and SM$^9$ have not been operated this cross-over will remain in its normal main track position. Also, when the train on the lower main track has advanced beyond the points of the track switch 10, the switch mechine SM$^{10}$ will be operated to its take-siding position, this because its lever was heretofore operated. As soon as the switch 10 has been operated to the take-siding position, bearing in mind that the signal lever for the signal 5 was operated to the proceed position, the route circuit extending from signal 1 to signal 5 is completed and is energized from the lefthand end, so that the new pre-conditioned route is established automatically by the passage of the trains off of the two previously existing conflicting routes. This circuit may be traced as follows:—beginning at the terminal (+), front contact 228 of relay SL⁵, 227, RR⁵, 226, 36, 107, 106, 105, 104, RR¹⁰, 103, 32, 102, 101, 100, 99, RR⁷⁻⁸, 98, 97, 96, 30, 136, 28, 56, 55, 54, 53, 52, RR¹, 51, 50, to the terminal (—).

Attention is directed to the resistance units 58 and 63, which units have been provided to balance the ohmic resistance of all of the various route circuits that may be established, it being particularly noted that any route circuit that may be established will have a total number of relays and resistances of four; for instance, the route circuit 1—3 includes the relays RR¹ and RR³ and the resistance units 58 and 63, whereas the route 1—5 includes the route relays RR¹, RR⁷⁻⁸, RR¹⁰ and RR⁵.

*Structure of Figs. 2A and 2B.*—Referring to Figs. 2A and 2B of the drawings, attention is directed to the fact that the track layout shown therein is exactly the same as that shown in Fig. 1, except that double lines have been used for illustrating the two rails of the double track and cross-overs. In order to facilitate disclosing the invention, the track rails, insulating joints, switches, switch machines, signals, track relays, correspondence relays, lock relays, route relays, and signal lever repeater relays shown in Figs. 2A and 2B have been designated by the same reference characters as those employed in Fig. 1, each of these devices performing exactly the same function as do the corresponding devices in Fig. 1 of the drawings. The route circuits shown in Figs. 2A and 2B of the drawings differ from those shown in Fig. 1 of the drawings by omission of the intermediate route relays RR⁷⁻⁸ and RR¹⁰ and the omission of the balancing resistance units 58 and 63, the function of these intermediate relays RR⁷⁻⁸ and RR¹⁰ being carried out by directional track repeater stick relays in Figs. 2A and 2B.

In the modified form of the invention shown in Figs. 2A and 2B there have been shown two series of these stick relays, one effective to give release locking for east-bound trains and the other effective to give release locking for west-bound trains, the relays for the east-bound tumble-down circuit have been designated ES, with an exponent corresponding to that of the track circuit associated therewith, and have been designated WS, with an exponent corresponding to that of the associated track circuit for westbound release locking.

It should be noted that the stick relay ES⁶ is energized through back contact 150 of relay SL¹ and back contact 149 of relay RR¹ in multiple, through front contact 151 of track relay T⁶, and that this relay ES⁶ through its contact 152 and 153 controls the stick relay ES⁷ and ES⁹. That the stick relay ES⁷ through its front contact 154 controls the stick relay ES¹², that the stick relay ES¹² through its contact 155 controls the stick relay ES⁸, and that stick relay ES⁸ has a front contact 156 included in the governing circuit for the stick relay ES⁹, and also controls the stick relay ES¹⁰ through its contact 157.

Further attention is directed to the fact that none of these stick relays when once deenergized can be picked up unless their associated track relay is energized. This function is carried out by the track relay contact 151 of track relay T⁶ for the relay ES⁶, is carried out by contact 160 of relay T⁷ for the relay ES⁷, by the contact 161 of relay T¹² for the relay ES¹², by the contact 162 for the relay T⁸ for the stick relay ES⁸, by the contact 163 of relay T⁹ for the stick relay ES⁹, by the contact 164 of track relay T¹⁰ for the relay ES¹⁰, and by the contact 176 of the track relay T⁵ for the relay ES⁵. Attention is now directed to the fact that each of these track relay contacts may be shunted out by a stick contact on the associated stick relay. These contacts have been numbered 165, 166, 167, 168, 169, 170 and 178 for the stick relays ES⁶, ES⁷, ES¹², ES⁸, ES⁹, ES¹⁰ and ES⁵, respectively.

It should be noted that the stick relay ES⁷ in addition to being controlled by the stick relay ES⁶ is also controlled by back contact 171 of the relay SL² in multiple with the back contact 240 of relay RR². Also, it should be noted that contact 152 of relay ES⁶ is shunted by the switch box contact 172 when the track switch 6 is in its main-track position, and that the contacts 171 and 240 of relay SL² and RR² are shunted out when this track switch 6 is in its cross-over position by the same switch box contact 172. Also, with the track switch 6 in the cross-over position the contact 153 of relay ES⁶ is shunted out by the switch box contact 173 of the track switch 6. Furthermore, the contact 157 of the stick relay ES⁸ is shunted out by the switch box contact 174 when the track switch 8 is in the cross-over position and similarly the contact 153 of the relay ES⁶ is shunted out when the track switch 8 is in the cross-over position, this through the medium of the switch box contact 175, and that the front contact 156 of the relay ES⁸ is shunted out by switch box contact 175 of track switch 8 when this track switch 8 is in the main track position, and further that front contact 158 of relay ES¹⁰ is normally shunted out by the switch box contact 177 of the track switch 10. From this consideration it will be noted that the simultaneous energization of the relays SL¹ and RR², for instance, will cause a series of stick relays to be deenergized depending upon the particular route that is then set up through the interlocking plant terminating at signal 1, and that these stick relays will pick up one after another in the rear of a train passing in the direction governed by the signal 1, providing that the signal relay SL¹ is deenergized in the meantime. In other words, these stick relays afford release locking in the rear of the train but maintain locking in advance of such moving train, such locking being accomplished through the medium of the various lock relays L, each having an exponent to correspond to the track switch which such lock relay can lock against movement. For instance, the lock relay L¹⁰ which locks the switch machine SM¹⁰ against operating the track switch 10 is controlled through two front contacts 180 and 181 in series of the directional stick relays WS¹⁰ and ES¹⁰, this circuit for relay L¹⁰ also including a front contact 182 of the track relay T¹⁰. In other words, both of the directional stick relays WS¹⁰ and ES¹⁰ as well as the detector track relay T¹⁰ must be energized before the switch machine SM¹⁰ can be operated. Since the relay WS¹⁰ is not deenergized for an east-bound train, and since the stick relay ES¹⁰ is reenergized as soon as an eastbound train has passed over the detector track circuit containing relay T¹⁰, the switch machine SM¹⁰ can be operated as soon as the east-bound train has cleared the detector track circuit thereof.

In the same manner as already explained in connection with the east-bound stick relay ES, the west-bound stick relays WS⁹, WS¹⁰ and WS⁵ are controlled by back contacts 187, 188, 189, 190, 191 and 192 of relays RR³, RR⁴, RR⁵, SL³, SL⁴ and and SL⁵, these relays WS⁹, WS¹⁰ and WS⁵ being further controlled by track relay contacts 193, 194 and 195, shunted respectively by stick contacts 196, 197 and 198. Relay WS¹⁰ is also controlled by a front contact 198 of relay WS⁵. Relay WS⁸ is controlled through front contacts 200, 201 and 202 of relays T⁸, WS⁹ and WS¹⁰, the relay WS¹² is controlled by a series circuit including in series front contacts 203 and 204 of relays T¹² and WS⁸, respectively. The relay WS⁷ is controlled by a circuit including in series the front contacts 206 and 207 of relays T⁷ and WS¹², respectively, and the relay WS⁶ is controlled by a circuit including in series the front contacts 208, 209 and 210 of relays T⁶, WS⁷ and WS⁹, respectively. It should be noted that the contacts 200, 203, 206 and 208 of track relays T⁸, T¹², T⁷ and T⁶ are respectively shunted by stick contacts 212, 213, 214 and 215 of relays WS⁸, WS¹², WS⁷ and WS⁶, respectively.

In order to make these stick relays function properly under the various route conditions, the front contact 245 of relay WS⁵ is shunted by the switch box contact 217 of track switch 10 when this track switch 10 assumes the main track position, this same contact 217 shunting out the relay contacts 187 and 191 when the track switch 10 assumes the take-siding position, the switch box contact 218 of track switch 9 shunts out the contact 201 of relay WS⁹ when the track switch 9 assumes the main track positon and its associated contact 219 shunts out the contact 210 of relay WS⁹ when the track switch 9 assumes the cross-over position, the switch box contact 220 of track switch 7 shunts out the front contact 209 of relay WS⁷ when the track switch 7 assumes the main-track position and shunts out the contact 210 of the relay WS⁹ when the track switch 7 is in the cross-over position.

Figure 2:
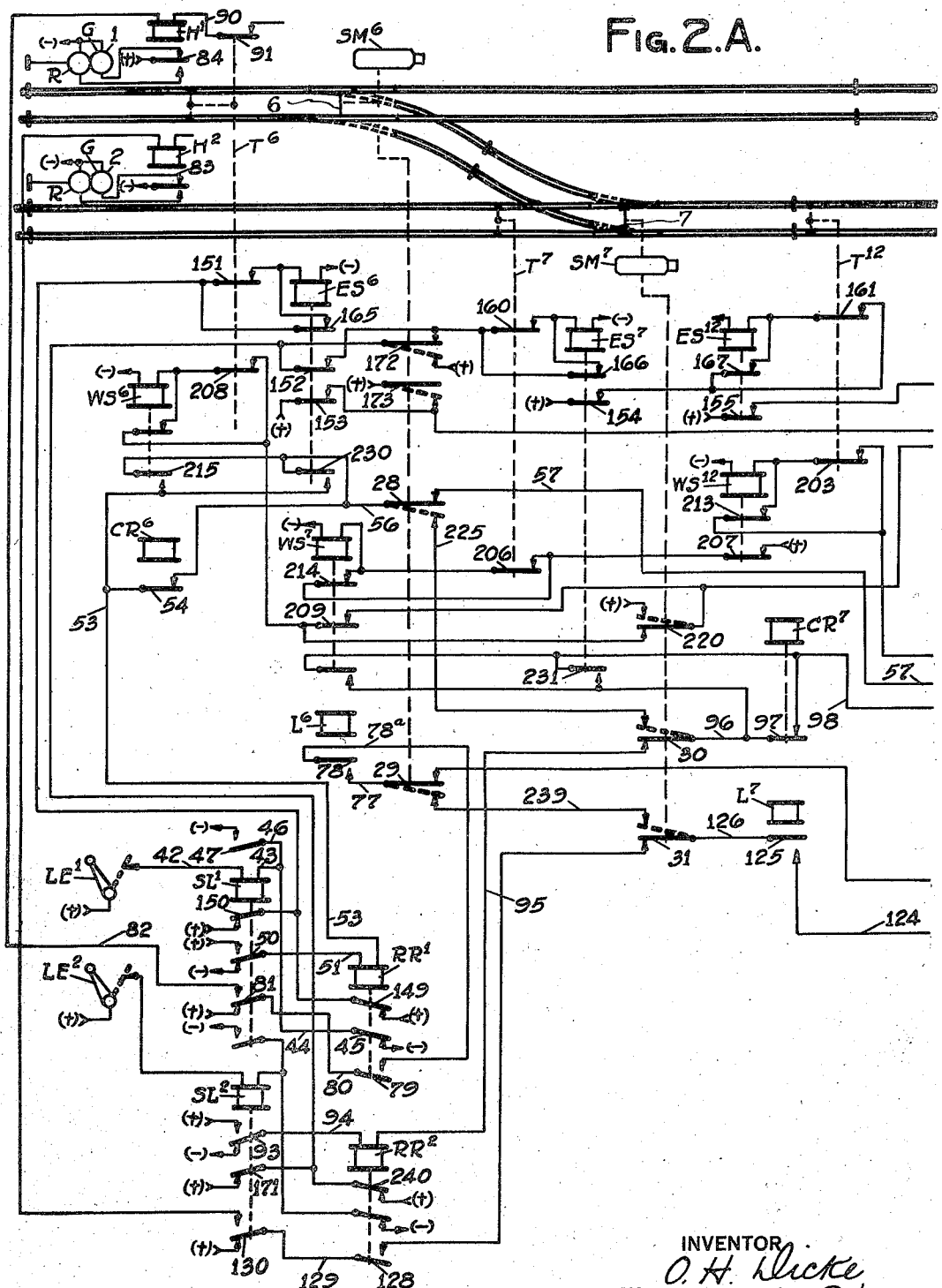
Figs. 2A and 2B show a modified form of the invention as applied to the same track layout as employed in Fig. 1 of the drawings.

*Operation of Fig. 2.*—Since all of the signals 1, 2, 3, 4 and 5 are normally at stop, as shown, and since under this condition all of the various lock relays L⁶, L⁷, L⁸, L⁹ and L¹⁰ are energized (it being assumed there are no trains in the plant), each of the various switch machines SM⁶, SM⁷, SM⁸, SM⁹ and SM¹⁰ is free to be operated. Let us therefore assume that the switch machines SM⁶, SM⁷ and SM¹⁰ are operated to their abnormal dotted position, as may be accomplished for the switch machine SM¹⁰ by moving the lever SML¹⁰ to the dotted position to effect energization of the reverse circuit R through the front contact 39 of the lock relay L¹⁰, the control circuit for the remaining switch machines not having been illustrated specifically. With the track switches 6, 7 and 10 now assuming their abnormal position, a route is established from the signal 1 to the signal 5.

Let us now assume that the operator moves his signal lever LE¹ to its clear position thereby effecting energization of the signal relay SL¹ and effecting closure of the following route circuit:— beginning at the terminal (+) of a suitable source of current, front contact 50 of the relay SL¹, wire 51, winding of the relay RR¹, wire 53, front contact 54 of the correspondence relay CR⁶, wire 56, switch box contact 28 of the track switch 6 assuming its dotted position, wire 225, switch box contact 30 of the track switch 7 assuming its cross-over position, wire 96, contact 97 of the correspondence relay CR⁷, wire 98, contact 100 of the correspondence relay CR⁸, wires 101 and 102, switch box contact 32 of the track switch 8 assuming its normal position, wire 103, contact 106 of correspondence relay CR¹⁰, wire 107, switch box contact 36 of the track switch 10 assuming its take-siding position, wire 226, winding of the relay RR⁵, wire 227, back contact 228 of the relay SL⁵ to the other terminal (—) of said source. The closure of this circuit will effect energization of the relays RR¹ and RR⁵.

Energization of the relay RR⁵ will produce no effect except it will open the pick-up circuit (not shown) for the relay SL⁵, but picking up of the relay RR¹ will result in deenergization of the stick relay ES⁶, because now the back contact 150 of the relay SL¹ as well as the back contact 149 of the relay RR¹ are open so that the relay ES⁶ is deenergized. Dropping of the relay ES⁶ will effect deenergization of the relay ES⁷, because the contact 152 of relay ES⁶ is now unshunted, the switch box contact 172 assuming its dotted position, but dropping of the contact 153 of the relay ES⁶ will not effect deenergization of the relay ES⁹, because this contact 153 is now shunted by the switch box contact 173 of the track switch 6. Dropping of the relay ES⁷ will effect deenergization of the relay ES¹² which in turn will effect deenergization of the relay ES⁸. Dropping of the relay ES⁸ will not effect deenergization of the relay ES⁹ because its contact 156 is shunted by the switch box contact 175 of track switch 8 assuming its normal position. Dropping of the relay ES⁸ will however effect deenergization of the relay ES¹⁰, which in turn will effect deenergization of the relay ES⁵ because the contact 158 of the relay ES¹⁰ is no longer shunted by the switch box contact 177 of the track switch 10.

In other words, the relays ES⁶, ES⁷, ES⁸, ES⁹ and ES⁵ will be deenergized in succession, so as to carry out two particular functions for each of these track switches. The first function is that each of these east-bound stick relays by their dropping effects shunting of the contacts of the correspondence relays included in the route circuit heretofore traced. For instance, the contact 54 of the correspondence relay CR⁶ is now shunted by the back contact 230 of the relay ES⁶, front contact 97 of correspondence relay CR⁷ is now shunted by the back contact 231 of the relay ES⁷, front contact 100 of correspondence relay CR⁸ is now shunted by back contact 232 of relay ES⁸, and front contact 106 of relay CR¹⁰ is shunted by back contact 233 of relay ES¹⁰.

The second function of these series stick relays is to deenergize the associated lock relay for each of these track switches. For instance, dropping of contact 181 of the stick relay ES¹⁰ effects deenergization of the lock relay L¹⁰ resulting in opening of its contact 39 to prevent operation of the switch machine SM¹⁰ and resulting in closing its back contact 120 included in the circuit for energizing the home relays H¹ or H² as the case may be, as more particularly pointed out hereinafter.

In a similar way, the relays ES⁶, ES⁷ and ES⁸ will effect deenergization of the lock relays L⁶, L⁷ and L⁸. As soon as these lock relays have assumed their deenergized position the following circuit for the home relay H¹ will be completed:—beginning at the terminal (+) of a suitable source of current, back contact 235 of the relay SL⁵, wire 236, front contact 237 of the relay RR⁵, wire 238, switch box contact 38 of the track switch 10 assuming its dotted position, wire 119, back contact 120, wire 121, switch box contact 33 of the track switch 8, wire 122, back contact 123 of the lock relay $L^8$, wire 124, back contact 125 of the lock relay $L^7$, wire 126, switch box contact 31 of track switch 7 assuming the dotted position, wire 239, switch box contact 29 of the track switch 6 assuming the dotted position, wire 77, back contact 78 of the lock relay $L^6$, wire $78^a$, front contact 79 of the relay $RR^1$, wire 80, front contact 81 of relay $SL^1$, wire 82, winding of the relay $H^1$, wire 90, front contact 91 of relay $T^6$ and other contacts controlled in accordance with traffic conditions in advance, to the other terminal (—). Picking up of relay $H^1$, assuming traffic conditions in advance to be favorable, will of course energize the clear green lamp G through front contact 84 of relay $H^1$.

In practice it may be desirable to operate both switch machines of the cross over 6—7 from the same lever, in which case both of these switch machines $SM^6$ and $SM^7$ would be locked by both of the lock relays $L^6$ and $L^7$. In other words, each switch machine circuit of switch machines $SM^6$ and $SM^7$ would include a front contact of relay $L^6$ and a front contact of relay $L^7$ in series. What has been said about the cross over 6—7 is also true of the cross over 8—9.

It has just been assumed that a route was set up extending from the signal 1 to the signal 5 and that the signal 1 has been cleared to allow a train movement over this route. The reader should be reminded that completion of the route circuit including the route relays $RR^1$ and $RR^5$, as heretofore explained, resulted in deenergization of a tumble-down circuit of east-bound stick relays ES, (containing the proper exponent) and that dropping of these various stick relays resulted in the shunting of the contacts of the associated correspondence relay CR (containing the proper exponent). The purpose of this is to allow movement of a switch lever after locking of the switch has been assured by dropping of the associated stick relay ES (having the proper exponent) so that a new route may be preconditioned, so to speak, that is the levers for a new route may be operated without actually effecting operation of their associated switch machines and signals.

Let us now assume that the operator wishes to precondition a new route extending from the signal 2 to the signal 3. In order to do so, the operator will move the levers for operation of the switch machines $SM^8$ and $SM^9$ to their crossover position, will operate the levers for the switch machines $SM^8$ and $SM^7$ to their main track position and the lever for clearing the signal 2 to its clear position. The cross over 8—9 will however not be operated because the lock relay $L^8$ is still deenergized, and cross over 6—7 will not be operated because the lock relays $L^6$ and $L^7$ are still deenergized, and the clear lamp G of the signal 2 will not be illuminated because the route relay $RR^2$ is still deenergized, this because the switch box contact 30 of track switch 7 still assumes the dotted position. As the first train passes over the first route extending from signal 1 to signal 5, and on the assumption that the operator has in the meantime returned his lever $L^1$ to its normal stop position, the non-occupancy of the cross-over 6—7 after passage of this first train will result in reenergization of the relays $ES^6$ and $ES^7$, which in turn will effect reenergization of the lock relay $L^6$ and $L^7$ thus allowing the switch machines $SM^6$ and $SM^7$ to return to their normal main track positions. Similarly, the switch machines $SM^8$ and $SM^9$ will be released from the locked condition by picking up of the lock relay $L^8$, as soon as the first train has passed beyond the track circuit containing the track relay $T^8$ which through its contact 162 closes a pick-up circuit for the relay $ES^8$, which in turn will effect reenergization of the lock relay $L^8$ and operation of the cross over 8—9 to the cross over position. As soon as this occurs the new route circuit including the route relays $RR^2$ and $RR^3$, readily traced in the drawings, will be completed thereby resulting in picking up of the relay $RR^2$, the relay $SL^2$ having been picked up when the lever $L^2$ was operated, so that now the stick relay $ES^7$ is deenergized because its circuit is broken at the back contact 240 of the relay $RR^2$, the back contact 171 of relay $SL^2$ already being open, in a manner as already explained. Deenergization of this relay $ES^7$ will now result in deenergization of the relays $ES^8$ and $ES^9$, these three relays in turn resulting in deenergization of the lock relays $L^7$, $L^8$ and $L^9$, thereby establishing a circuit readily traced in the drawings for the relay $H^2$, so that the second train can proceed passing over its route as soon as the rear end of the first train no longer interferes with such route.

Instead of shunting the contacts of correspondence relays by back contacts of the associated stick relays, as shown in Figs. 2A and 2B, they may be shunted by a back contact of the associated lock relay. Such an arrangement has been shown in Fig. 3, where contact 106 of relay $CR^{10}$ may be shunted by back contact 245 of the lock relay $L^{10}$. Also, if desired, the correspondence contacts in the route circuit of Figs. 2A and 2B may be shunted by front contacts of series route relays included in such route circuit, as shown in Figs. 1 and 4, the lock relays still being controlled as shown in Figs. 2A and 2B. Instead of employing signal levers such as shown in the drawings signal keys located at the proper point in a miniature track lay-out as shown in the prior application of S. N. Wight Ser. No. 540,596 filed May 28, 1931 may be used, if desired.

Applicant has thus disclosed two proposed systems for accomplishing the same general purpose in an interlocking system of the free lever type, namely, systems wherein after a particular route has been once established and its signal has been cleared, levers of a conflicting route may be operated to a conflicting position without accomplishing any result until the first and conflicting route no longer conflicts therewith, each track switch being operated just as soon as the rear end of the conflicting train has passed thereover, the system being such that each of the switch control levers for a route must be in correspondence with its associated switch machine before a signal can be cleared over such route, but wherein after the signal of such route has once been cleared, the levers for these switch machines may be moved to new positions without resulting in the operation of the switch machines until either a train has passed over the route, or a signal has been put to stop without such passage of the train.

Having thus shown and described several embodiments of the present invention, and having shown rather specific circuit arrangements for carrying out the various functions contemplated in accordance with the invention, it is desired to be understood that the specific circuits illustrated have not been selected for the purpose of showing the scope of the invention nor its exact construction, but have been selected for the purpose of disclosing the underlying principles thereof, and it is further to be understood that various changes, modifications and additions may be made to adapt the invention to the particular problem encountered in practicing the same, and that each of the features or sub-features of the invention may be used separately, all without departing from the spirit or scope of the invention except as demanded by the scope of the following claims.

What I claim as new is:—

1. In combination, a track switch, a switch machine for operating said track switch, a locking relay for preventing operation of said switch machine, a free and non-lockable lever for applying current to a control circuit for said switch machine which control circuit may only be broken by said lever and by a contact of said locking relay, a signal for governing movement of traffic over said track switch, and control means for said signal permitting clearing of said signal only if said lever and switch machine assume corresponding positions but which does not require such correspondence between said lever and switch machine to maintain said signal clear.

2. In combination, a track switch, a switch machine for operating said track switch, a locking relay for preventing operation of said switch machine, a free and a non-lockable lever for applying current to a control circuit for said switch machine which control circuit may only be broken by said lever and by a contact of said locking relay, a signal for governing movement of traffic over said track switch, a control circuit for said locking relay including a contact opened upon the approach of a train and a contact opened upon the initiation of the clearing of said signal, and control means for said signal permitting clearing of said signal only if said lever and track switch assume corresponding positions but which does not require such correspondence between said lever and track switch to maintain said signal clear.

3. In combination, a track switch, a switch machine for operating said track switch, a locking relay for preventing operation of said switch machine, a lever for applying current to a control circuit for said switch machine which control circuit may only be broken by said lever and by a contact of said locking relay, a signal for governing movement of traffic over said track switch, control means for said signal permitting clearing of said signal only if said lever and switch machine assume corresponding positions but which does not require such correspondence between said lever and switch machine to maintain said signal clear, and a signal control circuit for said signal controlled by said control means and closed only if said locking relay is deenergized.

4. In combination, a track switch, a switch machine for operating said track switch, a locking relay for preventing operation of said switch machine, a lever for applying current to a control circuit for said switch machine which control circuit may only be broken by said lever and by a contact of said locking relay, a signal for governing movement of traffic over said track switch, a control circuit for said locking relay including a contact opened upon passage of a train over said track switch and a contact opened upon the initiation of the clearing of said signal, and control means for said signal permitting clearing of said signal only if said lever and track switch assume corresponding positions but which does not require such correspondence between said lever and track switch to maintain said signal clear, whereby a new route may be pre-conditioned during the occupancy of a prior conflicting route as soon as said prior route has been established by a proceed signal and said new route is automatically set up upon leaving of the train off of said first route.

5. In combination, a track switch, a switch machine for operating said track switch, a locking relay for preventing operation of said switch machine when a signal governing traffic over said track switch is at proceed or a train is passing over said track switch, a free and non-lockable lever for applying current to a control circuit for said switch machine which control circuit may only be broken by said lever and by a contact of said locking relay, a signal for governing traffic over said track switch, control means for said signal permitting clearing of said signal only if said lever and track switch assume corresponding positions but which does not require such correspondence between said lever and track switch to maintain said signal clear, and a signal control circuit for said signal controlled by said control means and closed only if said locking relay is deenergized, whereby a new route may be pre-conditioned during the occupancy of a prior conflicting route as soon as said prior route has been established by a proceed signal and said new route is automatically set up upon leaving of the train off of said first route.

6. In combination, a track switch, a switch machine for operating said track switch, a locking relay for preventing operation of said switch machine when a signal governing traffic over said track switch is at proceed or a train is passing over said track switch, a lever for applying current to a control circuit for said switch machine which control circuit may only be broken by said lever and by a contact of said locking relay, a signal for governing movement of traffic over said track switch, and control means for said signal permitting clearing of said signal only if said lever and switch machine assume corresponding positions and said locking relay is deenergized but which does not require such correspondence between said lever and switch machine to maintain said signal clear, whereby a new route may be pre-conditioned during the occupancy of a prior conflicting route as soon as said prior route has been established by a proceed signal and said new route is automatically set up upon leaving of the train off of said first route.

7. In combination, a track switch, a switch machine for operating said track switch, a locking relay for preventing operation of said switch machine when a signal governing traffic over said track switch is at proceed or a train is passing over said track switch, a lever for applying current to a control circuit for said switch machine which control circuit may only be broken by said lever and by a contact of said locking relay, a signal for governing movement of traffic over said track switch, and control means for said signal permitting clearing of said signal only if said lever and track switch assume corresponding positions but which does not require such correcpondence between said lever and track switch to maintain said signal clear, whereby a new route may be pre-conditioned during the occupancy of a prior conflicting route as soon as said prior route has been established by a proceed signal and said new route is automatically set up upon leaving of the train off of said first route.

8. An interlocking system of the free lever electrical isolation type comprising, a track lay-out including a plurality of routes each containing a plurality of track switches, a switch contact for each track switch signifying the position of such track switch, a route circuit for each route conforming to such route and including the corresponding switch contact for each track switch, a series route relay for each increment of track all included in series in each route circuit and for signifying whether or not the route circuit for such increment of track is energized, a signal at each end of each route, means including a free lever for energizing each route circuit from one end at one time only, and means for permitting clearing of the signal at the energized end of the route circuit only.

9. An interlocking system of the free lever electrical isolation type comprising, a track lay-out including a plurality of routes each containing a plurality of track switches, a switch contact for each track switch signifying the position of such track switch, a route circuit for each route conforming to such route and including the corresponding switch contact for each track switch, a correspondence contact switch closed only if a track switch and the lever for controlling the same assume corresponding positions included for each track switch for each route in its route circuit, a series route relay for each increment of track all included in series in each route circuit having a front contact for shunting the corresponding correspondence contact, a signal at each end of each route, means including a free lever for energizing each route circuit from one end at one time only, and means for permitting clearing of the signal at the energized end of the route circuit only.

10. An interlocking system of the free lever new route pre-conditioning type comprising, a track lay-out including a plurality of routes each containing a plurality of track switches, a power-operated switch machine for operating each switch, a free lever for each track switch for controlling the same, lock-out means for each switch for preventing operation of a track switch when a signal governing traffic over the track switch indicates proceed or there is a train on the set-up route approaching the track switch, a signal at each end of each route for governing traffic over such route, and means for clearing a signal for governing traffic over a route which requires all track switches of the route and their control levers to assume corresponding positions to effect such clearing but wherein when such signal has once been cleared no such correspondence between levers and track switches is necessary to maintain it clear, whereby said levers may be set for a new route as soon as the signal for the previous route has been cleared.

11. An interlocking system of the free lever new route pre-conditioning type comprising, a track lay-out including a plurality of routes each containing a plurality of track switches, a power-operated switch machine for operating each switch, a free lever for each track switch for controlling the same, lock-out means for each switch for preventing operation of a track switch when a signal governing traffic over the track switch indicates proceed or there is a train on the set-up route approaching the track switch, a signal at each end of each route for governing traffic over such route, and means for clearing a signal for governing traffic over a route in one direction only which requires all track switches of the route and their control levers to assume corresponding positions to effect such clearing but wherein when such signal has once been cleared no such correspondence between levers and track switches is necessary to maintain it clear, whereby said levers may be set for a new route as soon as the signal for the previous route has been cleared.

12. An interlocking system of the free lever new route pre-conditioning type comprising, a track lay-out including a plurality of routes each containing a plurality of track switches, a power-operated switch machine for operating each switch, a free lever for each track switch for controlling the same, lock-out means for each switch machine for preventing operation of a track switch when a signal governing traffic over the track switch indicates proceed or there is a train on the set-up route approaching the track switch, a signal at each end of each route for governing traffic over such route, a circuit for clearing a signal which circuit includes a contact for each lock-out means for each track switch included in the route over which said signal governs traffic which contacts are closed only if such lock-out means are in their locked condition and which circuit includes in series therewith a correspondence contact for each such track switch and closed only if such track switch and its control lever assume corresponding positions, and means for shunting such correspondence contacts upon closure of said circuit.

13. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, means for energizing an otherwise closed route circuit, a signal controlled by such route circuit, and a series relay in each wire of said route circuit to manifest whether or not the track section corresponding to such relay is included in a set-up route.

14. In an interlocking system, the combination with a track lay-out containing a plurality of routes each including a plurality of track switches and track sections joining said switches, a plurality of route circuits each corresponding to one of said routes and each including a wire for each track section and a correspondence contact and a double throw circuit controller for each track switch, said correspondence contacts being closed only if the corresponding track switch and its control lever assume corresponding positions and said double throw circuit controller assuming a position corresponding to the position of the associated track switch, means for energizing an otherwise closed route circuit, a signal controlled by such route circuit, a series relay in each wire of said route circuit to manifest whether or not the track section corresponding to such relay is included in a set-up route, and a contact for shunting each correspondence contact consisting of a front contact of the associated series relay.

15. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch assuming a position corresponding to the position of such track switch, a lock relay for each track switch, a signal at each end of each route, and a circuit for clearing the signal of a route including in series the back contacts of all lock relays for all the track switches included in the route over which said signal governs traffic.

16. In an interlocking system, the combination with a track lay-out containing a plurality of routes each including a plurality of track switches and track sections joining said switches, a plurality of route circuits each corresponding to one of said routes and each including a wire for each track section and a double-throw contact for each track switch assuming a position corresponding to the position of such track switch, a correspondence contact for each double-throw contact included in series therewith and closed only if the corresponding track switch and its control lever assume corresponding positions, a lock relay for each track switch which if deenergized prevents operation of such track switch, means for deenergizing all the lock relays associated with a particular route when such route has been set up in the trackway, and a circuit for clearing the signal of a route including in series the back contacts of all lock relays for all the track switches included in the route over which said signal governs traffic.

17. In an interlocking system, the combination with a track lay-out containing a plurality of routes each including a plurality of track switches and track sections joining said switches, a plurality of route circuits each corresponding to one of said routes and each including a wire for each track section and a double-throw contact for each track switch assuming a position corresponding to the position of such track switch, a correspondence contact for each double-throw contact included in series therewith and closed only if the corresponding track switch and its control lever assume corresponding positions, a lock relay for each track switch which if deenergized prevents operation of such track switch, means for deenergizing all the lock relays associated with a particular route when such route has been set up in the trackway, a shunting contact for each correspondence contact comprising a back contact of the associated lock relay, means for deenergizing all lock relays of a set-up route upon initiating the clearing of a signal over such route, and a circuit for clearing the signal of a route including in series the back contacts of all lock relays for all the track switches included in the route over which said signal governs traffic, whereby correspondence between track switches and their control levers of a particular route is not required when signal clearing over such route has been initiated.

18. In an interlocking system, the combination with a track lay-out containing a plurality of routes each including a plurality of track switches and track sections joining said switches, a plurality of route circuits each corresponding to one of said routes and each including a wire for each track section and a double-throw contact for each track switch assuming a position corresponding to the position of such track switch, a correspondence contact for each double-throw contact included in series therewith and closed only if the corresponding track switch and its control lever assume corresponding positions, a lock relay for each track switch which if deenergized prevents operation of such track switch, means for deenergizing all the lock relays associated with a particular route when such route has been set up in the trackway, a shunting contact for each correspondence contact of a particular route closed when such route has been completely set up in the trackway and signal clearing is initiated, and a circuit for clearing the signal of a route including in series the back contacts of all lock relays for all the track switches included in the route over which said signal governs traffic, whereby correspondence between track switches and their control levers of a particular route is not required when signal clearing over such route has been initiated.

19. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, said circuit controller assuming a position corresponding to its track switch, manually operable means for energizing an established route circuit, and series relay means included in said route circuits for manifesting which of said track sections are included in an established route.

20. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, said circuit controller assuming a position corresponding to its track switch, manually operable means for energizing an established route circuit, a signal controlled by such route circuit, and series relay means included in said route circuits for manifesting which of said track sections are included in an established route.

21. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, said circuit controller assuming a position corresponding to its track switch, manually operable means for energizing an established route circuit, a signal controlled by such route circuit, series relay means included in said route circuits for manifesting which of said track sections are included in an established route, and means for controlling such signals in accordance with traffic conditions in advance.

22. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, manually operable means for energizing an established route circuit, and means controlled by an established route circuit for locking all track switches included in the corresponding route.

23. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, manually operable means for energizing an established route circuit, a lock relay for each track switch, and a signal control circuit for each route including a back contact of the lock relay for each track switch in such route and closable only when the corresponding route circuit is energized.

24. In an interlocking system, the combination with a track lay-out containing a plurality of routes each including a plurality of track switches and track sections joining said switches, a plurality of route circuits each corresponding to one of said routes and each including a wire for each track section and a double throw circuit controller for each track switch, said circuit controller assuming a position corresponding to its track switch, manually operable means for energizing an established route circuit, a lock relay for each track switch, a signal control circuit for each route including a back contact of the lock relay for each track switch in such route and closable only when the corresponding route circuit is energized, and means for controlling said signal control circuit in accordance with traffic conditions.

25. In an interlocking system, a track layout containing a plurality of track switches for forming a plurality of routes, manually governable power operated means for individually operating said track switches, a signal for each entrance location of said routes, said signal being capable of giving clear or stop indications, means preventing the power operation of any track switch in any one of said routes having its respective signal therefor cleared but allowing the manual act for the governing thereof to take place without affecting the indicating condition of said signal, and means causing a track switch to be operated by its power-operated means in response to such manual act, executed while the signal governing a route over it was clear, if said signal governing the route over said track switch is operated to stop.

26. In an interlocking system, a track layout containing a plurality of track switches for setting up a plurality of routes, power operating means for each track switch, control means for each power operating means whereby any of said routes may be set up, said control means being permitted to be operated to positions to set up a route conflicting with a route already set up over said track switches, and other means preventing the response of the individual power operating means for each switch in the second route which conflicts with the first route only until a train has passed over such switch of said first route.

27. In an interlocking system, a track layout containing a plurality of track switches for setting up a plurality of routes, power operating means for each of said track switches, levers for governing said power operating means, a signal for each entrance to said routes, said signal being capable of giving clear or stop indications, contacts corresponding to the positions of said track switches for establishing a plurality of route circuits, correspondence contacts in each route circuit closed only if the track switches in the route correspond with the positions of their respective levers, means allowing a signal for a particular route to indicate clear only when its route circuit is closed, means rendering the correspondence contacts in a route circuit ineffective when the signal for that route is cleared, and means preventing said power operating means for a track switch to respond to its lever when a route over it is cleared.

28. A railway switch and signal control system permitting levers to be set to establish a second route conflicting with a set up route but delaying the consummation of the second route until the first route ceases to conflict with the second route comprising, a particular route circuit conforming to a particular route through the track layout, a second route circuit conforming to a second route but conflicting with said first route through the track layout, track switches in each of said routes, levers for said track switches, contacts in said particular route circuit for each track switch in said particular route closed only if such lever and its track switch assume corresponding positions, means for shunting all of said contacts in said particular route when a signal for said route is cleared, and means for preventing operation of a track switch when a signal governing traffic over such track switch is clear or there is a train approaching such track switch.

29. A railway switch and signal control system permitting levers to be set to establish a second route conflicting with a set up route but delaying the consummation of the second route until the first route ceases to conflict with the second route comprising, a particular route circuit conforming to a particular route through the track layout, a second route circuit conforming to a second route but conflicting with said first route through the track layout, track switches in each of said routes, locking means for each track switch, levers for said track switches, contacts in said particular route circuit for each track switch in said particular route closed only if such lever and its track switch assume corresponding positions, a signal for governing traffic over such particular route controlled by a circuit closed only if all the track switches in said particular route are locked by their locking means, means for shunting all of said contacts in said particular route when a signal over said route is cleared, and means for each track switch responsive to a departing train which moved over such track switch for unlocking its respective locking means.

30. In an interlocking system for railroads; a track layout containing a plurality of track switches; a two-position circuit controller for each of said track switches, said circuit controller being operated to a position corresponding to the position of its track switch; wires connecting said circuit controllers in a manner corresponding to said track layout, whereby there is a continuous route circuit corresponding to each route established through said track layout; manually operable means for energizing an established route circuit; and series relay means included in each route circuit and associated with each track switch for manifesting when its track switch is included in a route having its corresponding route circuit energized.

31. In an interlocking system for railroads; a track layout containing a plurality of track switches; a switch machine for each track switch; a two-position circuit controller for each of said track switches, said circuit controller being operated to a position corresponding to the position of its track switch; wires connecting said circuit controllers in a manner corresponding to said track layout, whereby there is a continuous route circuit corresponding to each route established through said track layout; manually operable means for energizing an established route circuit, means associated with each track switch for manifesting when its track switch is included in a route having its corresponding route circuit energized, manually operable means for governing the operation of each of said switch machines, and lock means for each track switch for preventing the control of its switch machine when said means associated with said track switch manifests that said track switch has been included in a route having its route circuit energized.

32. In an interlocking system for railroads; a track layout containing a plurality of track switches, whereby a plurality of different routes can be set up; a switch machine for operating each of said track switches; a control lever for controlling the operation of each of said switch machines; a two-position circuit controller for each of said track switches, said circuit controller being operated to a position corresponding to the position of its track switch; a correspondence relay for each track switch and having contacts assuming active positions only when the said two-position circuit controller for that track switch is in a position corresponding to the control lever for that track switch; wires connecting said two-position circuit controllers and said contacts of said correspondence relays in an arrangement analogous to said track layout, whereby there is a continuous route circuit, corresponding to each route established through said track layout, when and only when each track switch is in a position corresponding to its control lever; manually operable means for energizing an established route circuit; signals for governing traffic through said routes; and means for clearing a signal for an established route when its corresponding route circuit is energized.

33. In an interlocking system for railroads; a track layout containing a plurality of track switches, whereby a plurality of different routes can be set up; a switch machine for operating each of said track switches; a control lever for controlling the operation of each of said switch machines; a two-position circuit controller for each of said track switches, said circuit controller being operated to a position corresponding to the position of its track switch; a correspondence relay for each track switch and having contacts assuming active positions only when the said two-position circuit controller for that track switch is in a position corresponding to the control lever for that track switch; wires connecting said two-position circuit controllers and said contacts of said correspondence relays in a manner corresponding to said track layout, whereby there is a continuous route circuit, corresponding to each route established through said track layout, when and only when each track switch is in a position corresponding to its control lever; manually operable means for energizing an established route circuit; means rendering said correspondence relay contacts ineffective in a route circuit irrespective of whether they are in active or inactive positions after said route circuit has been initially energized; locking means rendered effective for preventing the control of the switch machines by their control levers of those track switches in an established route when its corresponding route circuit is energized; signals for governing traffic through said routes; and means for clearing a signal for an established route when its corresponding route circuit is energized and when and only when said locking means for the switches in that route are rendered effective.

34. In an interlocking system for railroads; a track lay-out containing a plurality of track switches; a two-position circuit controller for each of said track switches, said circuit controller being operated to a position corresponding to the position of its track switch; wires connecting said circuit controllers in a manner corresponding to said track lay-out, whereby there is a continuous route circuit corresponding to each established route through said track lay-out; relays included in certain of said wires so that there is a relay for each connection in an established route circuit corresponding to a facing point position with regard to each track switch in an established route of said track lay-out; and manually governed means for energizing an established route circuit.

35. In an interlocking system for railroads; a track lay-out containing a plurality of track switches; a two-position circuit controller for each of said track switches, said circuit controller being operated to a position corresponding to the position of its track switch; wires connecting said circuit controllers in a manner corresponding to said track lay-out, whereby there is a continuous route circuit corresponding to each established route through said track lay-out irrespective of which route or routes are established at any one time; a relay included in each of those of said wire elements of a route circuit which divide into either of two paths by reason of the two-position circuit controllers with which they are connected; and means for at times energizing an established route circuit.

36. In an interlocking system for railroads; a track lay-out containing a plurality of power operated track switches; a two-position circuit controller for each of said track switches, said circuit controller being operated to a position corresponding to the position of its track switch; wires connecting said circuit controllers in a manner corresponding to said track lay-out, whereby there is a continuous route circuit corresponding to each established route through said track lay-out irrespective of which route or routes are established at any one time; a relay included in each of those of said wire elements of a route circuit which divide into either or two paths by reason of the two position circuit controllers with which they are connected; means for at times energizing an established route circuit; and means controlled by each of said relays when energized for maintaining its respective track switch in its last operated position.

37. In an interlocking system for railroads; a track lay-out containing a plurality of track switches; a two-position circuit controller for each of said track switches, said circuit controller being operated to a position corresponding to the position of its track switch; wires connecting said circuit controllers in a manner corresponding to said track lay-out, whereby there is a continuous route circuit corresponding to each established route through said track lay-out; relays included in certain of said wires so that there is a relay for each connection in an established route circuit corresponding to a facing point position with regard to each track switch in an established route of said track lay-out; balancing resistors included in certain of said wire elements so that the resistance of each route circuit is the same as every other route circuit capable of being established to correspond with a route of said track lay-out;

and manually governed means for energizing an established route circuit.

38. In an interlocking system for railroads; a track lay-out containing a plurality of track switches; contact means for each of said track switches, said contact means being operated to a position corresponding to the position of its track switch; wires connecting said contact means in a manner corresponding to said track lay-out, whereby there is a continuous route circuit corresponding and analogous in arrangement to each established route through said track lay-out; manually governed means for at times energizing an established route circuit; and a relay associated with each track switch and included in series in each of those route circuits corresponding to the routes set up over such track switch for thereby manifesting when that track switch is included in a route having its corresponding route circuit energized.

39. In an interlocking system for railroads; a series of track sections certain ones of which include a track switch; a track relay associated with each of said track sections; a directional stick relay associated with each of said track sections; a signal governing traffic over said track sections; a pick up circuit for each of said directional stick relays, except the first, including a front contact of its corresponding track relay and a front contact of its next preceding directional stick relay in an order extending in the direction of traffic governed by said signal; a pick up circuit for the first of said directional stick relays including a front contact of its corresponding track relay and contact means open only when said signal is caused to indicate clear; a stick contact on each of said directional stick relays for shunting said front contact on its said corresponding track relay; a control lever for controlling the operation of each of said track switches; a two-position circuit controller for each of said track switches, said circuit controller being operated to a position corresponding to the position of its track switch; a correspondence relay for each track switch having its contacts assume active positions only when the said two-position circuit controller for that track switch is in a position corresponding to the position of said control lever for that track switch; wires connecting said two-position circuit controller and said contacts of said correspondence relays in a manner analogous in arrangement to said track lay-out, whereby there is a continuous route circuit corresponding to each route established through said track lay-out when and only when each track switch is in a position corresponding to its said control lever; manually governable means for energizing an established route circuit to thereby cause said signal to clear, whereby said directional stick relays are deenergized in succession; means for preventing the operation of each track switch when its said corresponding directional stick relay is deenergized; and means for shunting said contacts of said correspondence relay for each track switch having its said two-position circuit controller in an established route circuit when the directional stick relay for the corresponding track switch is deenergized, whereby subsequent operation of the control levers for such track switches is ineffective to cause operation of their track switches and is ineffective to disturb a clear signal.

40. In an interlocking system, the combination with a track layout including conflicting and nonconflicting routes, said routes being establishable by the position assumed by cross-overs and track switches forming part of the track layout, a signal for each common starting point over such routes, switch machines for operating said track switches and cross-overs, a control relay for each switch machine, a route relay for each signal, a route circuit portion for each route extending from one to the other of two route relays associated with each route and having each end connected to one terminal of a source of current, contacts in said route circuit portion closed only if each switch machine involved in said route and its control relay assume the proper and corresponding position, whereby if either end of said route circuit portion is connected to the opposite terminal of said source such circuit portion and a route relay contained therein will be energized, and a second route circuit for each route closed only if each of the switches and cross-overs involved therein is locked and assumes the proper position for controlling the signal governing traffic entrance into said route and controlled by its associated route relay.

41. In combination, a railway track route including a plurality independently controllable track switches, control means for each of said track switches to control such track switch to a position corresponding to that assumed by such control means, a signal for governing traffic over said track route, a relay which must be energized to clear such signal, a pick-up circuit for said relay closed only if each of said track switches and its control means assume corresponding positions, and a holding circuit for said relay including a front contact of said relay and closed only if said track switches assume positions to establish such route but irrespective of the existence of correspondence between said track switches and their respective control means.

42. In combination, a railway track route including a plurality independently controllable track switches, control means for each of said track switches to control such track switch to a position corresponding to that assumed by such control means, a signal for governing traffic over said track route, a relay which must be energized to clear such signal, a pick-up circuit for said relay closed only if each of said track switches and its control means assume corresponding positions, and a holding circuit for said relay including a front contact of said relay and closed only if said track switches assume positions to establish such route.

43. In an interlocking system for railroads; a track layout containing a plurality of track switches; a circuit controller means for each of said track switches, said circuit controller means being operable to positions corresponding to the positions of its track switch; wires connecting said circuit controllers in a manner corresponding to said track layout, whereby said circuit controller means and said wires are jointly capable of forming a continuous route circuit corresponding to each route through said track layout; manually governed means for energizing an established route circuit; and relays included in certain of said wires so that the energization of a route circuit picks up a relay for each track switch in the corresponding route.

44. In an interlocking system for railroads; a track layout including a large number of track sections which are interconnected by track switches to form different track routes; a circuit controller means for each of the track switches; each of said circuit controller means being operable to positions corresponding to the positions of its respective track switch; wire elements connecting said circuit controller means in a manner corresponding to said track layout, there being wire elements associated with each of the track sections included in said track layout, whereby said circuit controller means and said wire elements are jointly capable of forming a continuous route circuit corresponding to each route through said track layout, manually governed means for at times energizing an established route circuit, and electro-responsive means associated with certain of said wire elements so as to be energized when such wire elements are included in a route circuit which is energized.

OSCAR H. DICKE.

DISCLAIMER 2,045,900.—*Oscar H. Dicke*, Rochester, N. Y. INTERLOCKING SYSTEM FOR RAILROADS. Patent dated June 30, 1936. Disclaimer filed November 30, 1937, by the assignee, *General Railway Signal Company*.

Hereby enters this disclaimer to claims 1, 2, and 3 of said Letters Patent.
[*Official Gazette December 28, 1937.*]

DISCLAIMER 2,045,900.—*Oscar H. Dicke*, Rochester, N. Y. INTERLOCKING SYSTEM FOR RAILROADS. Patent dated June 30, 1936. Disclaimer filed May 5, 1938, by the assignee, *General Railway Signal Company*.

Hereby enters this disclaimer to claims 22, 25, and 26 of said Letters Patent.
[*Official Gazette May 31, 1938.*]